United States Patent [19]

Sagou et al.

[11] Patent Number: 4,772,345

[45] Date of Patent: Sep. 20, 1988

[54] METHOD AND APPARATUS FOR MANUFACTURING PHOSPHOR SCREEN

[75] Inventors: Seiji Sagou; Takeo Itou, both of Fukaya, Japan

[73] Assignee: Kabushiki Kaisha Toshiba, Kawasaki, Japan

[21] Appl. No.: 31,785

[22] Filed: Mar. 30, 1987

[30] Foreign Application Priority Data

Mar. 31, 1986 [JP] Japan ................................. 61-70864

[51] Int. Cl.$^{4}$ ................................................ B32B 31/12

[52] U.S. Cl. ........................................ 156/67; 118/57; 427/68; 427/71; 427/72; 427/202; 427/346; 428/690; 430/23

[58] Field of Search ........................ 156/67; 427/68, 71, 427/72, 202, 240, 346; 430/23; 118/56, 57; 428/690

[56] References Cited

U.S. PATENT DOCUMENTS 4,469,766 9/1984 Nishizawa et al. ............ 427/54.1 X
4,687,825 8/1987 Sagou et al. ........................ 427/54.1

FOREIGN PATENT DOCUMENTS 59-117041 7/1984 Japan .

*Primary Examiner*—Robert A. Dawson
*Attorney, Agent, or Firm*—Cushman, Darby & Cushman

[57] ABSTRACT

A method of manufacturing a phosphor screen of uniform thickness on an inner surface of a panel of a cathode ray tube, comprising the steps of forming a powder-receptive adhesive pattern on the inner surface of a substantially rectangular panel having a skirt portion at the periphery, forming a sealed vessel consisting essentially of a container for containing phosphor powder and the panel by combining integrally the container and the panel so that the openings of both are opposed, and rotating the sealed container about an axis parallel to the inner surface of the panel.

9 Claims, 5 Drawing Sheets

METHOD AND APPARATUS FOR MANUFACTURING PHOSPHOR SCREEN

BACKGROUND OF THE INVENTION

I. Field of the Invention

This invention relates to a method of and an apparatus for manufacturing a panel of a cathode ray tube and, more particularly, to a method of manufacturing a phosphor screen by bonding phosphor particles on a powder-receptive adhesive pattern formed on the inner surface of a panel, and an apparatus therefor.

II. Prior Art

Heretofore, there is known a photo-adhesive method (disclosed in Japanese patent Disclosure No. 58-89751) as a method of manufacturing a phosphor screen on the inner surface of a panel of a color cathode ray tube. This method features the steps of coating a photosensitive composition which becomes adhesive upon the irradiating of a light thereon, on the inner surface of a panel of a cathode ray tube, drying the composition, then mounting a shadow mask on the panel, irradiating a light, through the apertures of the shadow mask, onto that portion of the photo-sensitive composition layer in which phosphor picture elements are to be formed, thereby forming a powder-receptive adhesive pattern. Then, phosphor powder is applied to the inner surface of the panel, for it to adhere to the adhesive pattern, the excess phosphor powder not adhering thereto is removed, and eventually developing the phosphor powder, thereby removing the photo-sensitive composition layer of that portion onto which the light is not irradiated. This series of steps, consisting of exposure, phosphor application, and development is repeated for first color, second color, and third color, so as to thereby manufacture a phosphor screen composed of three color phosphor picture elements. In the process of applying the phosphor powder to the inner surface of the panel, the powder is fed thereto by a separately provided powder-feeding device, the panel is rocked in X and Y directions by a rocking device, so as to slide the phosphor powder, in a zigzag manner, over the inner surface thereof, whereby the phosphor powder adheres to the adhesive pattern. Thereafter, the panel is inverted, and the excess, i.e., non-adhering phosphor powder is recovered.

However, the above-mentioned method has following drawbacks:

The phosphor powder sometimes adheres unevenly to or separates from the phosphor screen. A long period of time is required for the phosphor powder to adhere to the screen, and a large quantity of powder is scattered in the air when the excess phosphor powder is recovered. Further, an apparatus is required for recovering the excess phosphor powder thereby increasing the size and complexity of the overall powder-application/-recovery apparatus.

Another method of manufacturing a phosphor screen is disclosed in Japanese patent Disclosure No. 59-117041. This method features the steps of forming an adhesive pattern on the inner surface of a panel of a color picture tube, as in the case of the above-mentioned similar method, positioning the panel such that an adhesive pattern-forming surface is provided on the lower surface thereof, introducing the phosphor powder by means of an air flow from below, and adhering the phosphor powder to the adhesive pattern while moving on the inner surface of the panel. According to this method, it is not necessary to provide an apparatus for recovering the excess phosphor powder. On the other hand, the drawbacks of the previously-described conventional method, i.e., the increased complexity of the phosphor powder-application/-recovery apparatus, and the uneven adhering of the phosphor powder to the phosphor screen, also arise in the case of this method.

A method whereby the drawbacks of the abovementioned methods are eliminated is disclosed in Japanese patent Disclosure No. 60-207229. This method features the steps of positioning a panel such that the adhesive pattern-forming surface is directed upward, applying phosphor powder to the inner surface of the panel while rotating the panel about an axis passing through the center thereof, to allow the powder to slide on the inner surface of the panel and to adhere to the adhesive pattern. Using this method, the incidence of phosphor powder adhering unevenly is reduced. However, another drawback arises in that the thickness of the phosphor layer is less at the periphery that at the center of the panel. Since it is necessary, according to this method, to rotate the panel about an inclined axis, this gives rise to such drawbacks as the increased complexity of the phosphor powder-application/-recovery apparatus and the consequent large amount of space required for the installation of this apparatus.

In any of the above-mentioned methods, the phosphor powder is agglomerated in the case of the certain sort of the phosphor powder to cause the phosphor screen to become uneven. This is particularly inconvenient when this is applied to a small-sized picture tube.

SUMMARY OF THE INVENTION

It is an object of the present invention to provide a method of manufacturing a phosphor screen on the inner surface of a panel of a cathode ray tube, which is capable of efficiently forming a phosphor screen of uniform thickness under favorable working environment and at a low cost.

Another object of the present invention is to provide an apparatus of a simple structure, for manufacturing a phosphor screen in a panel of a cathode ray tube which is capable of executing the above-mentioned method.

In order to achieve the above and other objects, there is provided, according to the present invention, a method of manufacturing a phosphor screen on the inner surface of a panel of a cathode ray tube comprising the steps of:

forming a powder-receptive adhesive pattern on the inner surface of a substantially rectangular panel having a skirt portion at the peripheral edge;

forming a sealed vessel consisting essentially of a container for containing phosphor powder and the panel by combining integrally the container and the panel so that the openings of both are opposed; and rotating the sealed container about an axis parallel to the inner surface of the panel.

In the method of the present invention, the rotating speed of the sealed vessel is preferably 5 to 45 r.p.m.

According to the method of the invention described above, as the sealed vessel rotates, the phosphor powder is sequentially moved while sliding on the inner surface of the side of the panel, the powder-receptive adhesive pattern forming surface of the panel and the inner surface of the powder container. Thus, since a new adhesive surface of the powder-receptive adhesive pattern is always exposed by a capillarity phenomenon, a powder layer is firmly formed. Since a gravity is applied perpendicularly to the phosphor powder, the phosphor powder is not agglomerated on the inner surface of the panel, but the phosphor screen of uniform thickness can be provided. Therefore, the method of the invention can be particularly applied to the manufacture of a phosphor screen in a small-sized color cathode ray tube.

In the method of the present invention, the sealed vessel is not only rotated, but it is preferable to apply a vibration to the sealed vessel during its rotation. Thus, the method can prevent the phosphor powder from agglomerating to form a phosphor screen of more uniform thickness.

In the method of the invention, the rotational axis may be inclined and the inclining angle may be changed during the rotation.

Further, the sealed vessel may be reversely rotated after the rotation in a predetermined direction.

In the method of the invention, the rotational axis of the sealed vessel may be set substantially parallel to the long or short side of the rectangular panel.

According to the present invention, there is further provided an apparatus for manufacturing a phosphor screen on the inner surface of a panel of a cathode ray tube, which comprises a container for containing phosphor powder, a panel support for supporting the container and contacting the opening of the substantially rectangular panel having a skirt portion at the peripheral edge thereof with the opening of the container to hold both, a rotational axis of a sealed vessel consisting essentially of the panel and the container, substantially parallel to the contacting surface of the container with the panel, and driving means for rotating the sealed vessel about the rotational axis.

The apparatus for manufacturing a phosphor screen of the present invention constructed as described above has an extremely simple structure. With the apparatus, the phosphor powder does not externally leak, the recovery of the phosphor powder is not necessary, and efficient work under favorable working environment can be done.

DETAILED DESCRIPTION OF THE PREFERRED EMBODIMENTS

Examples of the present invention which are applied to a method for manufacturing a phosphor screen on the inner surface of a panel of a color picture tube, will be described in detail with reference to the accompanying drawings.

EXAMPLE 1

A following photo-sensitive composition which exhibits powder-receptive adhesive property by irradiating light thereto was coated in a thickness of approx. 0.8 mm on the inner surface of a panel of a color picture tube having a size of 14 inches.

Polyvinyl alcohol: 0.5 wt. %
diazonium salt: 4 wt.%
Surfactant: 0.008 wt. %
Water: Balance Then, a shadow mask was disposed at a position of a predetermined distance from the inner surface of the panel, and the photo-sensitive composition layer of the inner surface of the panel was exposed by a 1 kw super-high pressure mercury lamp disposed at a position approx. 200 mm apart from the inner surface of the panel through the apertures of the shadow mask for approx. 2 minutes to form a powder-receptive adhesive pattern in the exposed portion of the photo-sensitive composition layer.

Figure 1:
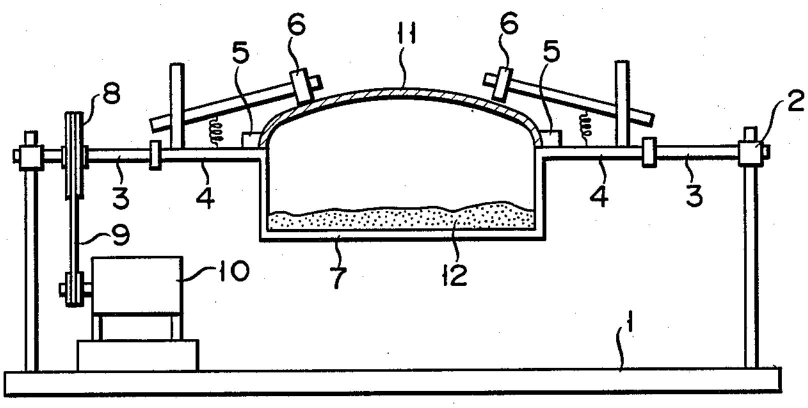
FIG. 1 is a view showing an embodiment of a powder application apparatus according to the present invention.

After the shadow mask was then removed, the panel was mounted in an embodiment of a phosphor powder application apparatus according to the present invention as shown in FIG. 1.

In the apparatus shown in FIG. 1, rotating axis 3 is mounted through bearing 2 on base 1 to support both ends of panel bed 4 for placing the panel. Guide 5 used to position the panel when mounting the panel on bed 4, and panel presser 6 for fastening the panel on bed 4 are provided on bed 4. Phosphor powder container 7 having an opening of the same size as the panel is provided on bed 4. When the panel is mounted on bed 4, the opening of the panel coincides with that of container 7. Pulley 8 for rotating axis 3 is mounted on axis 3, and is connected through belt 9 to motor 10.

To form a phosphor layer on the inner surface of the panel with such an apparatus, the phosphor powder is first fed into container 7, panel 11 formed with a powder-receptive adhesive pattern on the inner surface thereof is then disposed on bed 4 so that the opening of the panel coincides with that of container 7, positioned as predetermined, and the pressed by the panel presser from above to construct a sealed vessel consisting of container 7 and panel 11. Then, a motor is operated to rotate the sealed vessel.

Whenever the sealed vessel is rotated one revolution, the phosphor powder is slid sequentially on the inner surface of one side of the panel, the powder-receptive adhesive pattern and the inner surface of the other side of the panel and is again recovered in the powder container. This revolution is executed at a predetermined rotating speed such as 20 r.p.m. for one minute to form a phosphor powder layer on the inner surface of the panel.

Then, the panel is removed from the bed in the state that the phosphor powder layer is directed downward, air is blown to the inner surface of the panel to blow out unnecessary phosphor powder, thereby performing an air development.

Figure 2:
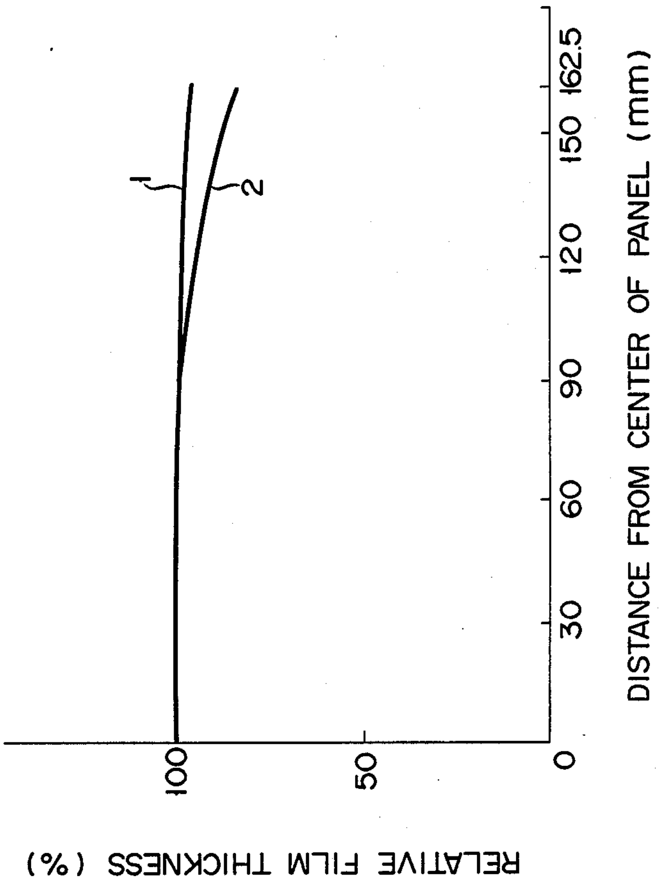
FIG. 2 is a graph illustraing the distribution of the thickness of a phosphor screen provided according to an embodiment of the present invention.

The distribution of the thickness of the phosphor screen of the inner surface of the panel (14 inch size type, diagonal length: 325 mm) thus obtained as described above is shown in FIG. 2. In FIG. 2, the ordinate denotes the relative film thickness (%) to that of the phosphor layer at the center of the panel, and the abscissa denotes the distance from the center of the panel in the diagonal direction. In FIG. 2, curve 1 indicates the distribution of the thickness of the phosphor screen provided in this example, and curve 2 denotes the distribution of the thickness of the phosphor screen provided by a method disclosed in Japanese Patent Disclosure No. 60-207229. As apparent from the comparison of curve 1 with curve 2, the phosphor screen provided by this example is excellent in the uniformity of the thickness of the phosphor screen as compared with the phosphor screen produced according to a conventional method.

EXAMPLE 2

The application of the phosphor powder was conducted only by the rotation of the sealed vessel in the Example 1, but further uniform phosphor screen can be provided by applying a vibration to the sealed vessel. This vibration can prevent the phosphor powder from agglomerating and aid the slide of the phosphor powder on the inner surface of the panel.

Figure 3:
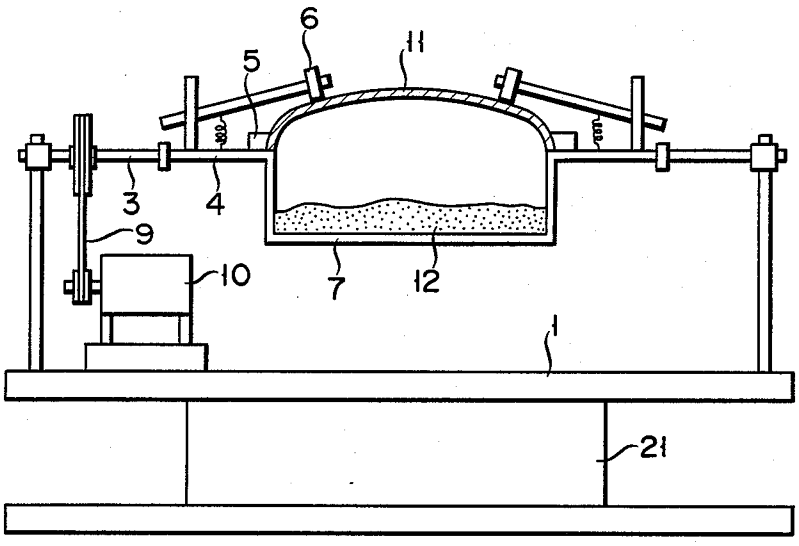
FIG. 3 is a view showing another embodiment of a powder application apparatus according to the present invention.

The rotation of the sealed vessel to be thus vibrated is achieved by another embodiment of an apparatus according to the invention as shown in FIG. 3. An apparatus shown in FIG. 3 has the same construction as that of the apparatus in FIG. 1 except that vibration generator 21 is provided under base 1. The sequence of the application of the phosphor powder by the apparatus in FIG. 3 is the same as the method shown in the Example 1 except that the sealed vessel is rotated and the generator is operated to vibrate the vessel.

EXAMPLE 3

Figure 4:
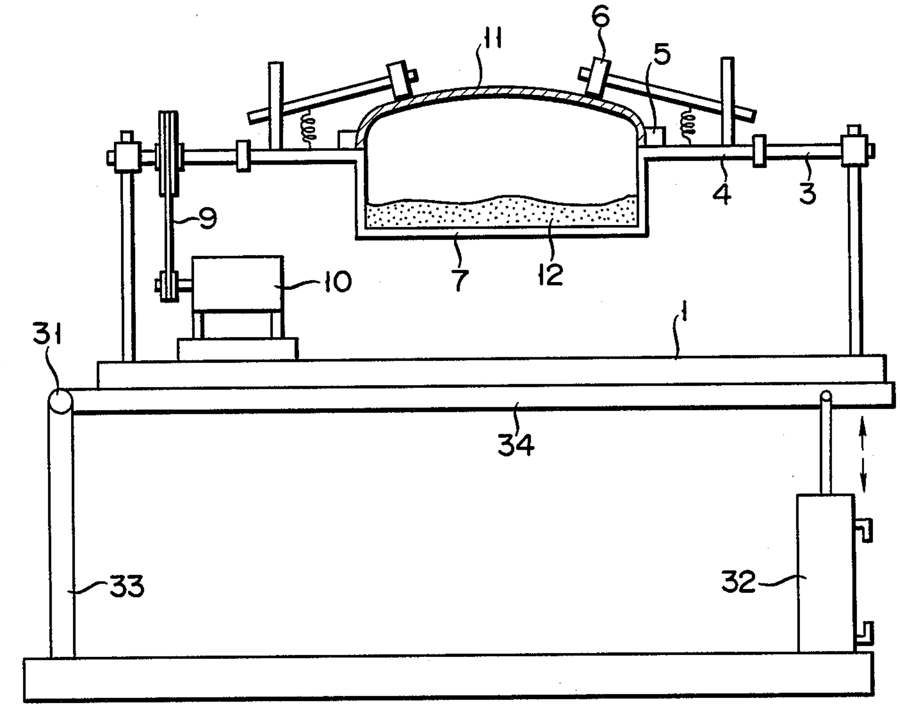
FIG. 4 is a view showing still another embodiment of a powder application apparatus according to the invention.

Still another embodiment of an apparatus according to the invention is shown in FIG. 4. An inclining device is additionally provided under base 1 of the apparatus of the Example 1. In other words, the inclining device which has hinge 31, air cylinder 32, frame 33 and base support 34 is disposed.

When phosphor powder is applied to the inner surface of the panel by the apparatus, the sealed vessel is rotated, and inclined to apply the phosphor powder to the inner surface of the panel.

The inclination of the axis at this time provides an advantage of uniformly forming the phosphor powder on the entire inner surface of the panel.

EXAMPLE 4

Figure 5:
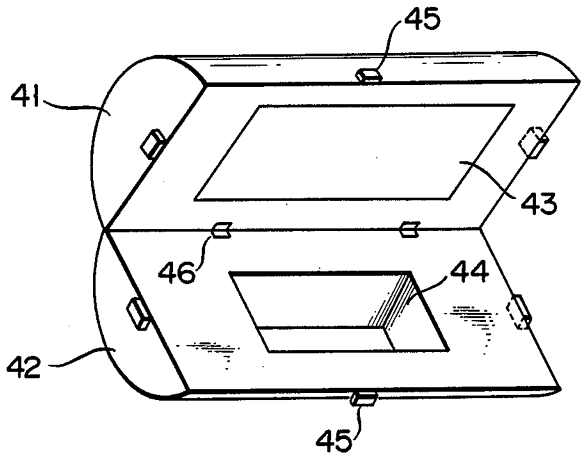
FIGS. 5 and 6 are views showing still further embodiments of a powder application apparatus according to the invention.
Figure 6:
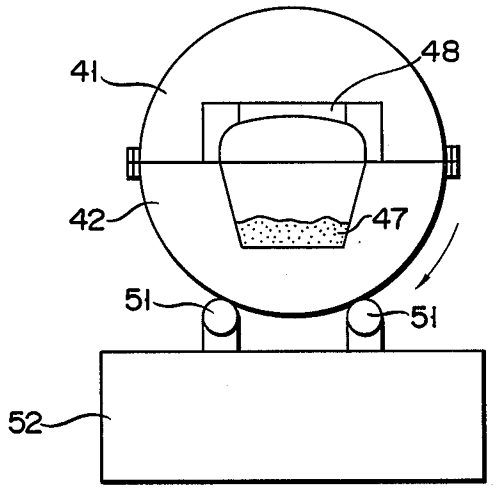

Still another embodiments of an apparatus according to the invention are shown in FIGS. 5 and 6. In FIG. 5, the apparatus comprises semicylindrical panel holder 41, semicylindrical phosphor powder container 42, recess 43 for holding the panel, recess 44 for filling the phosphor powder, chuck 45 and hinge 46. In FIG. 6, the apparatus comprises roller 51 for placing a sealed vessel shown in FIG. 5, and roller trestle 52.

To apply the phosphor powder with such an apparatus described above, panel 48 formed with a phosphor adhesive layer as predetermined is disposed, and the phosphor powder 47 is filled in the recess of the power container. The panel holder and the powder container connected by the hinge are associated to construct a sealed vessel, and the vessel is placed on the rollers. The rollers are rotated by a rotating device, not shown to rotate the sealed vessel in a direction of an arrow in FIG. 6.

At this time the vessel is rotated in the same manner as the previous Examples to form a phosphor screen on the inner surface of the panel with a very simple apparatus.

As described above, the sealed vessel having the panel and the phosphor powder container is not only rotated about a horizontal axis, but vibrated or rotated about an inclined axis to form a preferable phosphor screen on the inner surface of the panel. The shape or the rotating method of the sealed vessel may be modified variously according to the scope of the present invention. Efficient and preferable phosphor screen can be formed by the application of the rotating method adapted for the type of the phosphor, and/or the sizes and the shapes of the panel.

The phosphor powder has been described above. The present invention is not limited to this. Various powders may be applied to the substrate to form an excellent powder layer thereon.

According to the present invention as described above, the vessel having the panel and the powder container is sealed, rotated and the phosphor powder adhesive layer is formed on the inner surface of the panel. Therefore, the construction of the apparatus is simpled, and the powder layer having excellent characteristics of high quality having high packing density can be formed with less loss of the powder and in preferable working environment in a short time. Thus, the method of the present invention is industrially useful.

What is claimed is:

1. A method of manufacturing a phosphor screen on an inner surface of a panel of a cathode ray tube comprising the steps of:

forming a powder-receptive adhesive pattern on the inner surface of a substantially rectangular panel having a skirt portion at the periphery;

forming a sealed vessel consisting essentially of a container for containing phosphor powder and the panel by combining the container and the panel so that the openings of both are opposed; and rotating the sealed vessel about an axis parallel to the inner surface of the panel.

2. A method according to claim 1, wherein the rotating speed of said sealed vessel is 5 to 45 r.p.m.

3. A method according to claim 1, wherein a vibration is further applied to the sealed vessel during its rotation.

4. A method according to claim 1, wherein the rotational axis of the sealed vessel is inclined during the rotation and the inclining angle of the sealed vessel is varied.

5. A method according to claim 1, wherein after the sealed vessel is rotated in one direction, the vessel is rotated reversely.

6. A method according to claim 1, wherein the rotational axis of the sealed vessel is substantially parallel to the long or short side of the rectangular panel.

7. An apparatus for manufacturing a phosphor screen on an inner surface of a panel of a cathode ray tube, which comprises a container for containing phosphor powder, a panel support for supporting the container and contacting the opening of a rectangular panel having a skirt portion at the periphery thereof with the opening of the container to hold them, and driving means for rotating a sealed vessel consisting essentially of the container and the panel about a rotational axis substantially parallel to the contacting surface of the container with the panel.

8. An apparatus according to claim 7, further comprising vibration generating means for vibrating the sealed vessel.

9. An apparatus according to claim 7, further comprising means for inclining the rotational axis.

* * * * *